United States Patent [19]

Mizutani

[11] Patent Number: 5,146,529
[45] Date of Patent: Sep. 8, 1992

[54] METHOD OF FORMING AN OPTICAL FIBER UNIT

[75] Inventor: Akihiko Mizutani, Yokohama, Japan

[73] Assignee: Sumitomo Electronic Industries Ltd., Osaka, Japan

[21] Appl. No.: 740,660

[22] Filed: Aug. 2, 1991

Related U.S. Application Data

[63] Continuation of Ser. No. 543,540, Jun. 26, 1990, abandoned.

[30] Foreign Application Priority Data

Jun. 26, 1989 [JP] Japan .................................. 1-163341
Apr. 27, 1990 [JP] Japan .................................. 2-114255

[51] Int. Cl.$^5$ ................................................ G02B 6/44
[52] U.S. Cl. ..................... 385/103; 385/128; 427/163
[58] Field of Search ............... 350/96.29, 96.30, 96.31, 350/96.32, 96.33, 96.34; 427/163; 385/102, 103, 106, 127, 128

[56] References Cited

U.S. PATENT DOCUMENTS

| | | | |
|---|---|---|---|
| 3,772,870 | 11/1973 | Wong et al. | 350/96.34 X |
| 4,167,305 | 9/1979 | Ichiba et al. | 350/96.34 |
| 4,344,669 | 8/1982 | Uchida et al. | 350/96.3 |
| 4,629,285 | 12/1986 | Carter et al. | 350/96.29 X |
| 4,655,545 | 4/1987 | Yamanishi et al. | 350/96.34 |
| 4,747,662 | 5/1988 | Fitz | 350/96.32 |

FOREIGN PATENT DOCUMENTS

| | | |
|---|---|---|
| 0155092 | 9/1985 | European Pat. Off. . |
| 2355853 | 5/1974 | Fed. Rep. of Germany . |
| 62-73214 | 4/1987 | Japan . |
| 62-115110 | 5/1987 | Japan . |
| 62-286005 | 12/1987 | Japan . |
| 84/03085 | 8/1984 | PCT Int'l Appl. . |

OTHER PUBLICATIONS

Mogi, et al., "Manufacture of Cores for Optical Fibers Using UV-Curable Resin as Primary Coating", Chemical Chemical Abstracts, 110 (1989) Jan., No. 4, Colombus, Ohio, USA, p. 271.

Ito, et al., "Glass Optical Fibers Coated With Ultraviolet-Curable Resins", Chemical Abstracts, 109 (1988) Sep., No. 10, Columbus, Ohio, USA, p. 322.

Tsukamoto, et al., "Optical Fiber With Stable Light-Transmitting Characteristics", Chemical Abstracts 109 (1988) Sep., No. 10, Columbus, Ohio, USA, p. 323.

*Primary Examiner*—John D. Lee
*Attorney, Agent, or Firm*—Cushman, Darby & Cushman

[57] ABSTRACT

A coated optical fiber and an optical fiber unit including a plurality of coated optical fibers as well as a method of forming the optical fiber unit. The coated optical fiber is able to minimize transmission losses of the optical fiber unit by utilizing a pigment in a resin covering layer that covers an optical fiber strand in a specific range, the range being from 0.01 to 1.40 percent by weight.

5 Claims, 1 Drawing Sheet

METHOD OF FORMING AN OPTICAL FIBER UNIT

This is a continuation of application Ser. No. 07/543,540, filed on Jun. 26, 1990, which was abandoned upon the filing thereof.

BACKGROUND OF THE INVENTION

1. Field of the Invention

The present invention relates to a coated optical fiber. More particularly, the present invention relates to a coated optical fiber where a secondary layer of the coated optical fiber contains pigment and is colored by the pigment, and an optical fiber unit which is constructed by a plurality of the coated optical fibers using photo setting resin.

2. Description of the Art

FIG. 1 is a cross sectional view showing a structure of a typical coated optical fiber to which the present invention is applicable.

Generally, a coated optical fiber 11 is made up of a secondary layer 3 and an optical fiber strand 10 including an optical fiber 1 made of $SiO_2$ as a main component and a primary layer 2 made of material such as silicone resin or ultraviolet curable resin. The primary layer 2 coats the optical fiber 1, and the secondary layer 3 made of thermoplastic resin, e.g., nylon, coats the optical fiber strand 10. The resin of covering layers 2 and 3 is originally transparent, however where a plurality of coated optical fibers are gathered, as will be described below, the coated optical fiber 11 is frequently colored by mixing pigment into the secondary layer 3, in order to distinguish the coated optical fibers from one another.

Generally, the coated optical fiber thus constructed is dimensionally designed such that the diameter of optical fiber 1 is approximately 125 $\mu$m, the diameter of a strand as formed by covering the fiber with primary layer 2 is approximately 400 $\mu$m and the diameter of a coated optical fiber formed by covering the strand with secondary layer 3 is approximately 600 to 900 $\mu$m.

The coated optical fibers are usually used in such a way that a plurality of coated optical fibers are collectively arranged into an optical fiber unit or an optical fiber cable.

FIG. 2(a) is a cross sectional view showing a typical structure of an optical fiber unit using coated optical fibers. As shown, in an optical fiber unit 20, a tensile strength member 21 is disposed at the center. A plurality of coated optical fibers 11 are disposed around the member 21. Ultraviolet curable resin 22 is applied to an arrangement of the tensile strength member 21 and the coated optical fibers 11, and is cured into a single solid structure.

In manufacturing the optical fiber unit 20, coated optical fibers 11 are twisted and disposed around the tensile strength member 21. The ultraviolet curable resin 22 is then applied to an arrangement of the fibers and the member 21, forming a single solid structure. Finally, the ultraviolet curable resin layer 22 is cured by irradiating it with ultraviolet rays.

In the above described optical fiber unit, a coated optical fiber is covered with a plurality of covering layers, to form an optical fiber. A plurality of coated optical fibers are gathered, twisted, disposed around a tensile strength member, and covered again with ultraviolet curable resin. Even with such a solid structure, when the fiber unit is bent, transmission loss thereof is often remarkably increased.

Such a tendency of the fiber unit limits the practical bendable range of the fiber unit. This is one of the problems urgently needed to be solved in this technical field.

SUMMARY OF THE INVENTION

Accordingly, an object of the present invention is to provide an optical fiber unit with a broadened bendable range.

Another object of the present invention is to provide a coated optical fiber that is free from unexpected increases in transmission losses when coated optical fibers are gathered and assembled into a solid structure, and the resultant structure is bent.

According to an aspect of the present invention, there is provided a coated optical fiber including an optical fiber strand and a resin covering layer containing pigment for covering the optical fiber strand, wherein the resin covering layer contains pigment in the range of 0.01 to 1.40 percent by weight for the resin constituting the covering layer.

According to another aspect of the present invention, there is provided an optical fiber unit having an opaque tensile strength member, a plurality of coated optical fibers disposed around the tensile strength member, and an ultraviolet curable resin layer covering the tensile strength member and the coated optical fibers to form a single solid structure, wherein each coated optical fiber is a coated optical fiber as just described above.

Other objects, features and characteristics of the present invention, as well as the methods of operation and the functions of the related elements and the economies of manufacture will become apparent upon consideration of the following description and the appended claims with reference to the accompanying drawings, all of which form a part of this specification.

BRIEF DESCRIPTION OF THE DRAWINGS

This invention will be better described with reference to the drawings in which.

DETAILED DESCRIPTION OF THE PRESENTLY PREFERRED EXEMPLARY EMBODIMENTS

In a coated optical fiber according to the present invention, one of the essential features resides in that a concentration of pigment contained in the covering layer is set within a specific range.

Figure 2A:
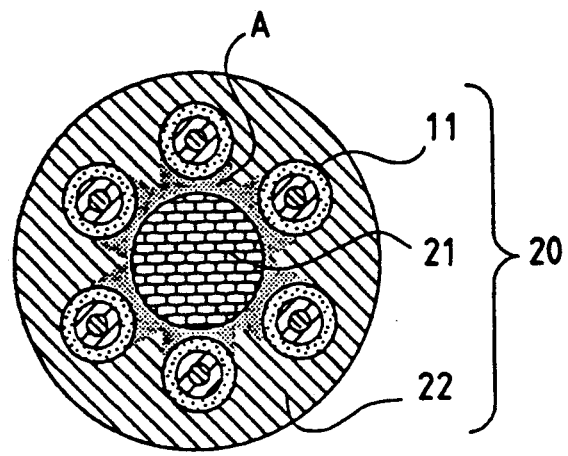
FIG. 2(a) is a cross sectional view showing a typical structure of an optical fiber unit using the coated optical fibers shown in FIG. 1.
Figure 2B:
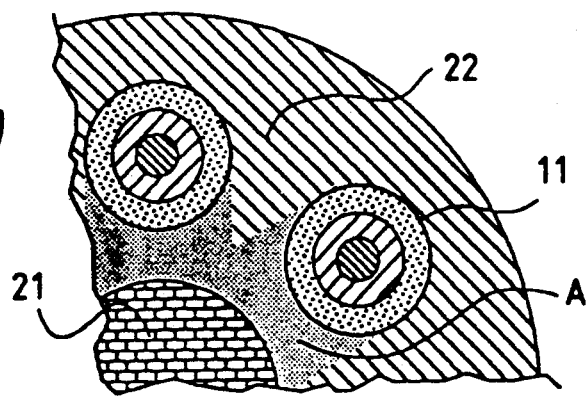
FIG. 2(b) shows an enlarged cross sectional view of a part of the cross section of the optical fiber unit shown in FIG. 2(a).

FIG. 2(b) shows an enlarged cross sectional view of a part of the cross section of an optical fiber unit shown in FIG. 2(a).

In an optical fiber unit 20 in which a plurality of located optical fibers 11 are assembled into a solid structure by ultraviolet curable resin, gaps between a tensile strength member 21 and the coated optical fibers 11 are filled with the ultraviolet curable resin. Consider the case where the fiber unit 20 is irradiated with ultraviolet rays. The member 21 is generally opaque and pigment is contained in the coated fibers 11. Accordingly, the irradiated ultraviolet rays are absorbed or scattered by those components. A quantity of the irradiated rays in an area A within the fiber unit is remarkably smaller than that of the irradiated rays in the remaining area. In the area A, the resin is insufficiently cured, resulting in incomplete fixing of the coated fibers 11 within the fiber unit. When such a fiber unit is bent, the coated fibers 11 are displaced within the fiber unit 20, so that the optical fiber 1 is locally bent. This increases transmission losses in the coated fiber or fiber unit. The above fact was found and confirmed by the inventor in the present patent application.

Constructing the coated fibers so that they are colorless or transparent should be avoided. Consider the case where colorless optical coated fibers are used for an optical fiber unit. The optical fiber unit is extremely long and both ends of the fiber unit are separated by an extremely long distance. Therefore, it is very difficult to identify a specific coated optical fiber at both ends of the fiber unit, because the coated fibers are all transparent and hence cannot be distinguished from one another. To identify each coated optical fiber, it is necessary to enter light into the coated fiber at one end and receive it at the other end. This work must repeatedly be done for all coated fibers. However, it is almost impossible to apply such a coated fiber identifying technique for a fiber unit containing a great number of coated optical fibers. In this respect, use of pigment for coated optical fiber is essential in practical use.

One possible way to accelerate curing of the ultraviolet curable resin in the optical fiber unit is to increase the energy of the irradiating ultraviolet rays. The ultraviolet rays, energy (expressed usually in mJ) is the product of an intensity of ultraviolet rays (usually in mW) and irradiation time (usually in second). It is clear that to accelerate the curing of the resin, it is necessary to increase the irradiation time or the intensity of the ultraviolet rays. Actually, a light source for emitting ultraviolet rays also emits infrared rays for heating the ultraviolet curable resin. Accordingly, if quantity of ultraviolet rays is increased, the resin deteriorates due to heat.

Ideally, the curing of the entire resin is saturated, but unfortunately, such is not the case. When the quantity of the energy of ultraviolet rays is merely increased, a portion of the optical fiber unit which is not shaded with the coated fibers is fully saturated and is undergoing deterioration already, while in a portion shaded with the coated fibers, the curing of the resin is not yet saturated and the resin has been insufficiently cured.

The inventor has found that a strictly optimized density of pigment mixed into the covering layer of a coated optical fiber can provide both excellent visual identification of coated optical fibers and perfect curing of ultraviolet curable resin.

According to the present invention, a concentration of pigment mixed into resin as the material of a covering layer, or a secondary layer, of the coated optical fiber for coloring the layer is set at 0.01 to 1.40 percent by weight in a standard coated optical fiber in which the diameter of an optical fiber strand is approximately 400 $\mu$m, and a thickness of a resin layer covering the fiber strand is 100 to 250 $\mu$m.

When the concentration of the pigment exceeds the above range, ultraviolet curable resin used for an optical fiber unit cures irregularly. On the other hand, when it is below the above noted range, it is difficult to visually perceive the coloration of the coated fiber. Accordingly, it becomes meaningless to use the pigment.

When the thickness of the covering layer made of the resin mixed with the pigment exceeds the above range, the concentration of the pigment must be properly decreased, in order to secure an optimum quantity of transmitted ultraviolet rays. Generally, where a particle diameter of the pigment exceeds a wavelength of transmitted light, a transmissivity is abruptly decreased. Therefore, it is preferable to use pigment of the smallest possible particle diameter. A preferable particle diameter of the pigment is 50 $\mu$m or less, although it depends on the wavelength of ultraviolet rays used.

White pigment, such as $TiO_2$, may be used as pigment providing white color, but usually it is used together with other pigment, in order to make color clear. In a case where a plurality of pigments are used, a total concentration of the pigments must be selected so as to allow a smooth transmissivity of ultraviolet rays.

In cases where pigment of $TiO_2$ is solely used, a concentration of the pigment in the covering layer is preferably within a range of 0.01 to 0.80 percent by weight. In case where a combination of the pigment $TiO_2$ and another pigment is used, a concentration of the pigment $TiO_2$ is preferably within a range of 0.01 to 0.80 percent by weight, a concentration of the remaining pigment is preferably within a range of 0.03 to 1.00% by weight. In this case, a total concentration of those pigments must be within the above range.

The optical fiber according to the present invention is based on the assumption that the coated optical fibers disposed around the tensile strength member are not arranged in a line as radially viewed. To manufacture an optical fiber unit having such a structure that the coated fibers are disposed in an alignment fashion, it is preferable that a concentration of pigment contained in each coated fiber must be properly decreased.

Some examples of the present invention will be described, but it should be understood that those examples are used by way of example, and the present invention is not limited to such examples.

EXAMPLE 1

Coated optical fibers were manufactured according to the present invention, and characteristics were measured.

Figure 1:
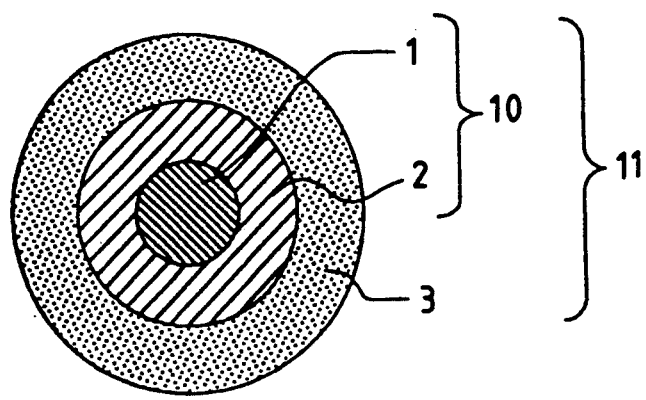
FIG. 1 is a cross sectional view showing a structure of a typical coated optical fiber to which the present invention is applicable.

An optical fiber of 125 $\mu$m in diameter was covered with a primary layer made of ultraviolet curable resin, thereby forming an optical fiber strand of 400 $\mu$m in diameter. The strand thus formed was further covered with a secondary layer 100 $\mu$m thick, thereby forming a coated optical fiber as shown in FIG. 1. The secondary layer was made of nylon containing pigment and $TiO_2$ at concentrations as shown in Table 1. A diameter of each coated fiber was 0.6 mm.

TABLE 1

|  | Pigment concentration (% by weight) | $TiO_2$ concentration (% by weight) |
| --- | --- | --- |
| Sample Number (1) | 0.30% | 0.50% |

An optical fiber unit structured as shown in FIG. 2(a) by using six coated optical fibers was manufactured. Six coated optical fibers were twisted and disposed around a tensile strength member as a steel wire of 0.6 mm in diameter. Then, ultraviolet curable resin was applied to an arrangement of the tensile strength member and the twisted coated fibers, thereby forming an optical fiber unit of about 2.7 mm in diameter. The layer was cured by irradiating it with ultraviolet rays of 100 mJ.

A transmission loss of an optical fiber unit thus formed was measured. Then, it was wound around a drum of 100 mm in diameter by three turns, and an increase of the transmission loss was measured. The measurement result is as shown in Table 2.

TABLE 2

| Sample Number (1) | Increase of transmission loss |
|---|---|
| | Below measurement limit |

As seen from Table 2, in the optical fiber unit using the coated optical fibers 11 according to the present invention, an increase of the transmission loss due to bending was negligible. The color of each coated fiber was satisfactorily perceived by naked eyes.

EXAMPLE 2

To form a colored covering layer material, pigments (of white, blue, yellow, red, and black) were mixed into 12 nylon at mixing ratios as shown in Table 3. In Table 3, concentration of each pigment contained in the colored covering material at each mixing ratio was expressed in weight percent. In the table, colors of each pigment in the column of "Mixed pigments" are shown in the left column. For white, its pigment in the column of "Mixed pigments" is blue pigment. In Table 3, materials whose pigment's concentrations are outside the concentration range as defined by the present invention were used for preparing comparative coated fibers.

TABLE 3-1

| Color | Mixed pigments (% by weight) | | | Remarks | Sample Number |
|---|---|---|---|---|---|
| | TiO$_2$ | Pigment | Total | | |
| White | 2.091 | 0.545 | 2.636 | Comparative Example | 2 |
| Blue | 1.182 | 0.909 | 2.091 | Comparative Example | 3 |
| Yellow | 1.091 | 1.182 | 2.273 | Comparative Example | 4 |
| Red | — | 1.818 | 1.818 | Comparative Example | 5 |
| Black | — | 1.000 | 1.000 | Example | 6 |

TABLE 3-2

| Color | Mixed pigments (% by weight) | | | Remarks | Sample Number |
|---|---|---|---|---|---|
| | TiO$_2$ | Pigment | Total | | |
| White | 1.438 | 0.375 | 1.813 | Comparative Example | 7 |
| Blue | 0.813 | 0.625 | 1.438 | Comparative Example | 8 |
| Yellow | 0.750 | 0.813 | 1.563 | Comparative Example | 9 |
| Red | — | 1.350 | 1.350 | Example | 10 |
| Black | — | 0.688 | 0.688 | Example | 11 |

TABLE 3-3

| Color | Mixed pigments (% by weight) | | | Remarks | Sample Number |
|---|---|---|---|---|---|
| | TiO$_2$ | Pigment | Total | | |
| White | 0.742 | 0.194 | 0.935 | Example | 12 |
| Blue | 0.419 | 0.323 | 0.742 | Example | 13 |
| Yellow | 0.387 | 0.419 | 0.806 | Example | 14 |
| Red | — | 0.645 | 0.645 | Example | 15 |
| Black | — | 0.355 | 0.355 | Example | 16 |

TABLE 3-4

| Color | Mixed pigments (% by weight) | | | Remarks | Sample Number |
|---|---|---|---|---|---|
| | TiO$_2$ | Pigment | Total | | |
| White | 0.377 | 0.098 | 0.475 | Example | 17 |
| Blue | 0.213 | 0.164 | 0.377 | Example | 18 |
| Yellow | 0.197 | 0.213 | 0.410 | Example | 19 |
| Red | — | 0.328 | 0.328 | Example | 20 |
| Black | — | 0.180 | 0.180 | Example | 21 |

TABLE 3-5

| Color | Mixed pigments (% by weight) | | | Remarks | Sample Number |
|---|---|---|---|---|---|
| | TiO$_2$ | Pigment | Total | | |
| White | 0.007 | 0.002 | 0.009 | Comparative Example | 22 |
| Blue | 0.004 | 0.003 | 0.007 | Comparative Example | 23 |
| Yellow | 0.004 | 0.004 | 0.008 | Comparative Example | 24 |
| Red | — | 0.007 | 0.007 | Comparative Example | 25 |
| Black | — | 0.004 | 0.004 | Comparative Example | 26 |

By using the colored resin thus prepared, coated optical fibers were manufactured as in Example 1. An optical fiber of 125 μm in diameter was covered with a primary layer made of ultraviolet curable resin, thereby forming an optical fiber strand of 400 μm in diameter. The strand thus formed was further covered with a secondary layer, thereby forming a coated optical fiber of 600 μm in outer diameter. An optical fiber unit was manufactured for each type of the coated fibers in the same way as that for Example 1. Specifications of the fiber unit were the same as those of Example 1.

As in Example 1, an increase of transmission loss of each of 25 number of optical fiber units was measured. The results of the measurements are shown in Table 4.

TABLE 4

| Sample No. | Increase of Transmission loss [dB] | Sample No. | Increase of Transmission loss [dB] |
|---|---|---|---|
| 2 | 0.010 | 15 | Below measurement limit |
| 3 | 0.009 | 16 | ↑ |
| 4 | 0.007 | 17 | ↑ |
| 5 | 0.015 | 18 | ↑ |
| 6 | Below measurement limit | 19 | ↑ |
| 7 | 0.005 | 20 | ↑ |
| 8 | 0.004 | 21 | ↑ |
| 9 | 0.005 | 22 | ↑ |
| 10 | Below measurement limit | 23 | ↑ |
| 11 | ↑ | 24 | ↑ |
| 12 | ↑ | 25 | ↑ |
| 13 | ↑ | 26 | ↑ |
| 14 | ↑ | | |

As seen from Table 4, when an optical fiber unit using the coated optical fibers as the comparative coated optical fibers in which pigment of more than 1.4 percent by weight is contained in the resin, is bent, the transmission loss is remarkably increased. When an optical fiber unit using coated optical fibers as manufactured according to the present invention is bent, no increase of the transmission loss was measured. Also in the case of an optical fiber unit using coated optical fibers in which pigment of less than 0.01 percent by weight is contained in the resin, no increase of the transmission loss was measured. However, it was difficult to perceive the color of the coated fiber.

In the examples and the comparative examples as mentioned above, 12 nylon was used for the covering material of the coated fiber. Alternatively, the covering material may be any of vinyl chloride, polyethylene, 6 nylon, and nylon or nylon copolymer as mixture of various types of nylon.

As described above, the present invention succeeded in providing a coated optical fiber that can form an optical fiber unit in which each coated fiber can be visually identified, and when the fiber unit is bent, no increase of transmission loss occurs in the fiber unit or coated fibers.

A coated optical fiber according to the present invention can readily be identified by a color of its covering layer. When an optical fiber unit is manufactured using such coated fibers, the coated fibers allow ultraviolet rays to transmit therethrough with little loss. Accordingly, ultraviolet curable resin can be cured uniformly when it is irradiated with ultraviolet rays, and a reliable support of the coated fibers are ensured. Consequently, an optical fiber unit manufactured using the coated fibers suffers from little transmission loss when it is bent.

While the invention has been described in connection with what is presently considered to be the most practical and preferred embodiment, it is to be understood that the invention is not to be limited to the disclosed embodiments, but on the contrary, is intended to cover various modifications and equivalent arrangements included within the spirit and scope of the appended claims.

For example, a metal layer such as a Cu or Ag plating layer may be provided on the surface of the tensile strength member 21, so that ultraviolet ray is reflected on the metal layer toward the area A shown in FIG. 2.

Further, metal pieces may be mixed in the ultraviolet curable resin 22, so that ultraviolet ray is reflected toward the region A.

Still further, a fluorescent paint emitting ultraviolet ray may be coated on the surface of the tensile strength member 21. Still further, a fluorescent pigment (fluorescent paint) may be used to color the coated optical fiber 11.

What is claimed is:

1. A method of forming an optical fiber unit, said method comprising the steps of:
   mixing an optimized concentration of pigments into a resin covering layer for a coated optical fiber, the concentration of pigments mixed into said resin covering layer being in a range of from 0.01 to 1.40 by weight,;
   applying said resin covering layer to a plurality of coated optical fibers, each of said plurality of coated optical fibers being colored differently by the resin covering layer;
   arranging said plurality of coated optical fibers around an inner tensile member;
   applying an ultraviolet curable resin about the arrangement of the plurality of coated optical fibers and said tensile member; and
   passing ultraviolet light through said plurality of coated optical fibers and thus curing said ultraviolet curable resin by irradiating it with said ultraviolet light.

2. A method as claimed in claim 1, wherein said applying said resin covering layer step includes applying said resin onto optical fibers having a diameter of approximately 125 $\mu$m.

3. A method as claimed in claim 2, wherein said applying said resin covering layer step includes applying a resin to said optical fibers so that resulting optical fiber strands have a diameter of approximately 400 $\mu$m.

4. A method as claimed in claim 2, wherein said method further comprises the step of coating said optical fiber strand with said resin covering layer so that said resin covering layer is 100 $\mu$m to 250 $\mu$m.

5. A method as claimed in claim 1, wherein said mixing step includes mixing at least $TiO_2$ into said pigments.

* * * * *